US012283111B2

(12) United States Patent
Yasui et al.

(10) Patent No.: US 12,283,111 B2
(45) Date of Patent: Apr. 22, 2025

(54) CONTROL APPARATUS AND CONTROL METHOD USING CAPTURED IMAGE OF EXTERNAL ENVIRONMENT OF VEHICLE

(71) Applicant: HONDA MOTOR CO., LTD., Tokyo (JP)

(72) Inventors: Yuji Yasui, Wako (JP); Gakuyo Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 506 days.

(21) Appl. No.: 17/697,032

(22) Filed: Mar. 17, 2022

(65) Prior Publication Data
US 2022/0309798 A1 Sep. 29, 2022

(30) Foreign Application Priority Data
Mar. 24, 2021 (JP) .................................. 2021-050327

(51) Int. Cl.
*G06V 20/58* (2022.01)
*B60W 50/10* (2012.01)
*B60W 50/14* (2020.01)

(52) U.S. Cl.
CPC ............. *G06V 20/58* (2022.01); *B60W 50/10* (2013.01); *B60W 50/14* (2013.01); *B60W 2050/146* (2013.01); *B60W 2420/403* (2013.01); *B60W 2554/4049* (2020.02)

(58) Field of Classification Search
CPC ...... G06V 20/58; G06V 20/56; G06V 20/588; B60W 50/10; B60W 50/14; B60W 2554/4049; B60W 2050/146; B60W 2420/403; B60W 30/09; B60R 1/00;
(Continued)

(56) References Cited

U.S. PATENT DOCUMENTS

| 8,675,041 B2 | 3/2014 | Kuboyama et al. |
| 8,994,825 B2 | 3/2015 | Ramanath et al. |
| 2010/0110189 A1 | 5/2010 | Kuboyama et al. |
| (Continued) | | |

FOREIGN PATENT DOCUMENTS

| JP | 2008-210084 A | 9/2008 |
| JP | 2009-012652 A | 1/2009 |
| (Continued) | | |

OTHER PUBLICATIONS

Japanese Office Action for Japanese Patent Application No. 2021050327 mailed Sep. 9, 2024.

*Primary Examiner* — Aaron W Carter
(74) *Attorney, Agent, or Firm* — Thomas | Horstemeyer, LLP

(57) ABSTRACT

A control apparatus for a vehicle including an image capturing device periodically acquires an image of an external environment of the vehicle from the image capturing device and recognizes a target object in the external environment of the vehicle based on the acquired image. The apparatus controls setting of a predetermined region for the acquired image and performs distortion reduction processing for reducing distortion of the image for the set predetermined region. In a case where a particular target object that is recognized is included in the predetermined region, the apparatus changes the predetermined region such that a region other than the particular target object included in the predetermined region increases.

9 Claims, 9 Drawing Sheets

(58) Field of Classification Search
CPC ........... B60R 1/27; B60R 11/04; G06T 7/593; B60K 35/00
See application file for complete search history.

(56) References Cited

U.S. PATENT DOCUMENTS

| | | | |
|---|---|---|---|
| 2013/0027558 A1 | 1/2013 | Ramanath et al. | |
| 2018/0093619 A1* | 4/2018 | Han | ..................... B60R 1/31 |
| 2019/0266423 A1* | 8/2019 | Akiba | ..................... G06K 9/00 |
| 2022/0309624 A1* | 9/2022 | Yasui | ..................... G06T 3/047 |
| 2022/0309625 A1* | 9/2022 | Yasui | ..................... B60W 40/06 |
| 2022/0309798 A1* | 9/2022 | Yasui | ..................... G06V 10/243 |
| 2022/0311936 A1* | 9/2022 | Yasui | ..................... B60R 11/04 |
| 2022/0318960 A1* | 10/2022 | Tsuchiya | ..................... G06T 7/70 |
| 2022/0319191 A1* | 10/2022 | Kanehara | ..................... G06V 20/58 |

FOREIGN PATENT DOCUMENTS

| | | | | |
|---|---|---|---|---|
| JP | 2009-081496 A | | 4/2009 | |
| JP | 2011061511 A | * | 3/2011 | ............ G06T 3/00 |
| JP | 2015186051 A | * | 10/2015 | ............ G06T 1/00 |
| JP | 2017055177 A | * | 3/2017 | ............ G06T 3/4038 |
| JP | 2018-171964 A | | 11/2018 | |
| WO | WO-2019215979 A1 | * | 11/2019 | ............ G06T 7/223 |

\* cited by examiner

CONTROL APPARATUS AND CONTROL METHOD USING CAPTURED IMAGE OF EXTERNAL ENVIRONMENT OF VEHICLE

CROSS-REFERENCE TO RELATED APPLICATION(S)

This application claims priority to and the benefit of Japanese Patent Application No. 2021-050327 filed on Mar. 24, 2021, the entire disclosure of which is incorporated herein by reference.

BACKGROUND OF THE INVENTION

Field of the Invention

The present invention relates to a control apparatus and a control method using a captured image of the external environment of a vehicle.

Description of the Related Art

A technique of capturing an image of the external environment of a vehicle by a camera for use in driver assistance has been known. Japanese Patent Laid-Open No. 2018-171964 proposes a technique of capturing an image of a wide area behind a vehicle by a camera with a wide-angle lens such as a fisheye lens. In this technique, an image captured by a camera provided with a wide-angle lens is subjected to coordinate transform about the optical axis position of the lens, and a central region of the image is cut out for display, so that the driver can take a close look at the central region during parking.

Meanwhile, in a case where an image captured by a camera provided with a wide-angle lens is subjected to coordinate transform and a part of the image is cut out to recognize the external environment of the vehicle, the presence of a shielding object (e.g., a guardrail) in the captured image may result in failure to obtain a desired recognition result with respect to a region other than the shielding object in which a more important recognition target may exist, such as due to an insufficient area of the region.

SUMMARY OF THE INVENTION

The present invention has been made in view of the above issue, and it is an object of the present invention to realize a technique capable of reducing the influence of a shielding object in target object recognition using an image captured by a camera provided with a wide-angle lens.

In order to solve the aforementioned issues, one aspect of the present disclosure provides a control apparatus for a vehicle including an image capturing device, the control apparatus comprising: one or more processors; and a memory storing instructions which, when the instructions are executed by the one or more processors, cause the control apparatus to function as: an image acquisition unit configured to periodically acquire an image of an external environment of the vehicle from the image capturing device; a first recognition unit configured to recognize a target object in the external environment of the vehicle based on the image acquired from the image capturing device; a region control unit configured to control setting of a predetermined region for the image acquired from the image capturing device; and a processing unit configured to perform distortion reduction processing for reducing distortion of the image for the set predetermined region, wherein in a case where a particular target object recognized by the first recognition unit is included in the predetermined region, the region control unit changes the predetermined region such that a region other than the particular target object included in the predetermined region increases.

In order to solve the aforementioned issues, another aspect of the present disclosure provides a control apparatus for a vehicle including an image capturing device, the control apparatus comprising: one or more processors; and a memory storing instructions which, when the instructions are executed by the one or more processors, cause the control apparatus to function as: an image acquisition unit configured to periodically acquire an image of an external environment of the vehicle from the image capturing device; a recognition unit configured to recognize a target object in the external environment of the vehicle based on the image acquired from the image capturing device; a region control unit configured to control setting of a predetermined region for the image acquired from the image capturing device; and a processing unit configured to perform distortion reduction processing for reducing distortion of the image for the set predetermined region, wherein the region control unit sets the predetermined region in a region in which a particular target object is not recognized by the recognition unit.

In order to solve the aforementioned issues, still another aspect of the present disclosure provides a control method for a vehicle including an image capturing device, the control method comprising: periodically acquiring an image of an external environment of the vehicle from the image capturing device; recognizing a target object in the external environment of the vehicle based on the image acquired from the image capturing device; controlling setting of a predetermined region for the image acquired from the image capturing device; and performing distortion reduction processing for reducing distortion of the image for the set predetermined region, wherein the controlling setting of a predetermined region includes, in a case where a particular target object recognized in the recognizing is included in the predetermined region, changing the predetermined region such that a region other than the particular target object included in the predetermined region increases.

According to the present invention, it is possible to reduce the influence of a shielding object in target object recognition using an image captured by a camera provided with a wide-angle lens.

DESCRIPTION OF THE EMBODIMENTS

Figure 1:
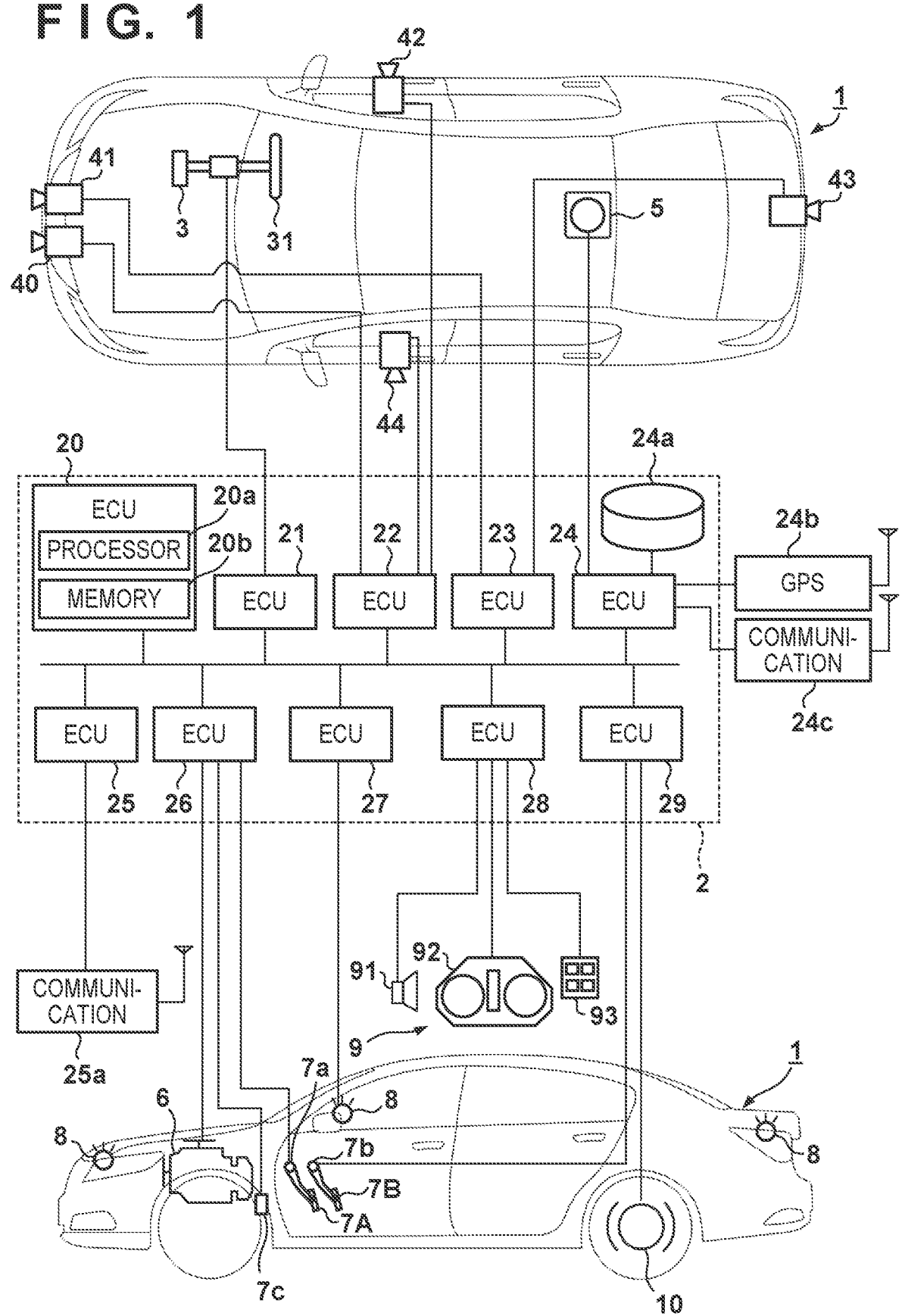
FIG. 1 shows a configuration example of a vehicle according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

(Configuration of Vehicle)

FIG. 1 is a block diagram of a vehicle 1 according to an embodiment of the present invention. In FIG. 1, the vehicle 1 is schematically shown in a plan view and a side view. The vehicle 1 is, for example, a four-wheeled passenger vehicle of a sedan type. The vehicle 1 may be such a four-wheeled vehicle, a two-wheeled vehicle, or another type of vehicle.

The vehicle 1 includes a vehicle control apparatus 2 (hereinafter referred to simply as a control apparatus 2) that controls the vehicle 1. The control apparatus 2 includes a plurality of electronic control units (ECUs) 20 to 29 communicably connected by an in-vehicle network. Each ECU includes a processor such as a central processing unit (CPU) or a graphics processing unit (GPU), a memory such as a semiconductor memory, an interface with an external device, and the like. The memory stores programs executed by the processor, data used for processing by the processor, and the like. Each ECU may include a plurality of processors, memories, interfaces, and the like. For example, the ECU 20 includes a processor 20a and a memory 20b. The processor 20a executes instructions including the programs stored in the memory 20b, so that processes are executed by the ECU 20. Alternatively, the ECU 20 may include a dedicated integrated circuit such as an application specific integrated circuit (ASIC) for executing processes by the ECU 20. The same applies to the other ECUs.

Hereinafter, functions and the like assigned to the ECUs 20 to 29 will be described. Note that the number of ECUs and the functions assigned to the ECUs can be designed as appropriate and can be subdivided or integrated as compared with the present embodiment.

The ECU 20 executes control related to automated traveling of the vehicle 1. In automated driving, at least one of the steering and acceleration/deceleration of the vehicle 1 is automatically controlled. The automated traveling controlled by the ECU 20 may include automated traveling that requires no traveling operations by the driver (which may also be referred to as automated driving) and automated traveling for assisting traveling operations by the driver (which may also be referred to as driving assistance).

The ECU 21 controls an electric power steering device 3. The electric power steering device 3 includes a mechanism for steering front wheels according to driver's driving operations (steering operations) on a steering wheel 31. In addition, the electric power steering device 3 includes a motor for exerting driving force for assisting steering operations and automatically steering the front wheels, a sensor for detecting the steering angle, and the like. In a case where the driving state of the vehicle 1 is automated driving, the ECU 21 automatically controls the electric power steering device 3 in response to instructions from the ECU 20 and controls the traveling direction of the vehicle 1.

The ECUs 22 and 23 control detection units for detecting the surrounding situation of the vehicle and performs information processing on detection results. The vehicle 1 includes one standard camera 40 and four fisheye cameras 41 to 44 as detection units for detecting the surrounding situation of the vehicle. The standard camera 40 and the fisheye cameras 42 and 44 are connected to the ECU 22. The fisheye cameras 41 and 43 are connected to the ECU 23. The ECUs 22 and 23 can extract the contour of a target object and a vehicle lane line (such as a white line) on the road by analyzing images captured by the standard camera 40 and the fisheye cameras 41 to 44. It is also possible to recognize the type and region of a target object located relatively close.

The fisheye cameras 41 to 44 are cameras provided with a fisheye lens. The configuration of the fisheye camera 41 will be described below. The others of the fisheye cameras 41 to 44 may have similar configurations. The angle of view of the fisheye camera 41 is wider than the angle of view of the standard camera 40. Thus, the fisheye camera 41 can capture an image of a wider area than the standard camera 40. An image captured by the fisheye camera 41 has larger distortion than an image captured by the standard camera 40. Therefore, the ECU 23 can perform simplified target object recognition by using an image captured by the fisheye camera 41, but may perform transform processing for reducing distortion (hereinafter referred to as "distortion reduction processing") on the image before performing higher-accuracy analysis. On the other hand, the ECU 22 may not perform the distortion reduction processing on an image captured by the standard camera 40 before analyzing the image. Thus, the standard camera 40 is an image capturing device for capturing an image not subject to the distortion reduction processing, and the fisheye camera 41 is an image capturing device for capturing an image subject to the distortion reduction processing. Instead of the standard camera 40, another image capturing device, for example, a camera provided with a wide-angle lens or a telephoto lens, that captures an image not subject to the distortion reduction processing may be used.

The standard camera 40 is attached at the center of a front portion of the vehicle 1 and captures an image of a surrounding view forward of the vehicle 1. The fisheye camera 41 is attached at the center of a front portion of the vehicle 1 and captures an image of a surrounding view forward of the vehicle 1. In FIG. 1, the standard camera 40 and the fisheye camera 41 are shown as being aligned horizontally. However, the arrangement of the standard camera 40 and the fisheye camera 41 is not so limited, and they may be aligned vertically, for example. In addition, at least one of the standard camera 40 and the fisheye camera 41 may be attached to a front portion of the roof (for example, on the vehicle interior side of the windshield) of the vehicle 1. The fisheye camera 42 is attached at the center of a right-side portion of the vehicle 1 and captures an image of a surrounding view on the right of the vehicle 1. The fisheye camera 43 is attached at the center of a rear portion of the vehicle 1 and captures an image of a surrounding view behind the vehicle 1. The fisheye camera 44 is attached at the center of a left-side portion of the vehicle 1 and captures an image of a surrounding view on the left of the vehicle 1.

The types, number, and attachment positions of the cameras provided to the vehicle 1 are not limited to the above-described example. In addition, the vehicle 1 may include a light detection and ranging (lidar) or a millimeter-wave radar as a detection unit for detecting a target object around the vehicle 1 and measuring the distance to the target object.

The ECU 22 controls the standard camera 40 and the fisheye cameras 42 and 44 and performs information processing on detection results. The ECU 23 controls the fisheye cameras 41 and 43 and performs information processing on detection results. The reliability of the detection results can be improved by dividing the detection units for detecting the surrounding situation of the vehicle into two systems.

The ECU 24 controls a gyroscope sensor 5, a GPS sensor 24b, and a communication device 24c and performs information processing on detection results or communication results. The gyroscope sensor 5 detects rotational movements of the vehicle 1. The course of the vehicle 1 can be determined by a detection result of the gyroscope sensor 5, the wheel speed, and the like. The GPS sensor 24b detects the current position of the vehicle 1. The communication device 24c performs wireless communication with a server that provides map information and traffic information, and acquires these pieces of information. The ECU 24 can access a database 24a of map information constructed in the memory, and the ECU 24 performs a search for a route from the current position to a destination and the like. The ECU 24, the map database 24a, and the GPS sensor 24b constitute a so-called navigation device.

The ECU 25 includes a communication device 25a for vehicle-to-vehicle communication. The communication device 25a performs wireless communication with other vehicles around to exchange information with the vehicles.

The ECU 26 controls a power plant 6. The power plant 6 is a mechanism for outputting driving force for rotating driving wheels of the vehicle 1 and includes, for example, an engine and a transmission. For example, the ECU 26 controls the output of the engine in response to driver's driving operations (accelerator operations or acceleration operations) detected by an operation detection sensor 7a provided on an accelerator pedal 7A and switches the gear ratio of the transmission based on information such as the vehicle speed detected by a vehicle speed sensor 7c and the like. In a case where the driving state of the vehicle 1 is automated driving, the ECU 26 automatically controls the power plant 6 in response to instructions from the ECU 20 and controls the acceleration and deceleration of the vehicle 1.

The ECU 27 controls lighting devices (such as headlights and taillights) including direction indicators 8 (blinkers). In the example of FIG. 1, the direction indicators 8 are provided at front portions, door mirrors, and rear portions of the vehicle 1.

The ECU 28 controls an input/output device 9. The input/output device 9 outputs information to the driver and accepts an input of information from the driver. A sound output device 91 notifies the driver of information by sound. A display device 92 notifies the driver of information by displaying an image. The display device 92 is arranged in front of a driver's seat, for example, and constitutes an instrument panel or the like. Note that, while sound and display are used here by way of example, the notification of information may also use vibration or light. In addition, the notification of information may use a combination of two or more of sound, display, vibration, and light. Furthermore, different combinations or different notification forms may be used according to the level (for example, the degree of urgency) of the information for which to make notification. An input device 93 is a group of switches arranged at a position operable by the driver and used to make instructions to the vehicle 1. The input device 93 may also include a sound input device.

The ECU 29 controls a brake device 10 and a parking brake (not shown). The brake device 10 is a disc brake device, for example, is provided to each wheel of the vehicle 1, and applies resistance to the rotation of the wheels to decelerate or stop the vehicle 1. The ECU 29 controls the operation of the brake device 10 in response to a driver's driving operation (brake operation) detected by an operation detection sensor 7b provided to a brake pedal 7B, for example. In a case where the driving state of the vehicle 1 is automated driving, the ECU 29 automatically controls the brake device 10 in response to instructions from the ECU 20 and controls the deceleration and stop of the vehicle 1. The brake device 10 and the parking brake can also be operated to maintain the stopped state of the vehicle 1. In addition, in a case where the transmission of the power plant 6 is provided with a parking lock mechanism, the parking lock mechanism can also be operated to maintain the stopped state of the vehicle 1.

Figure 2A:
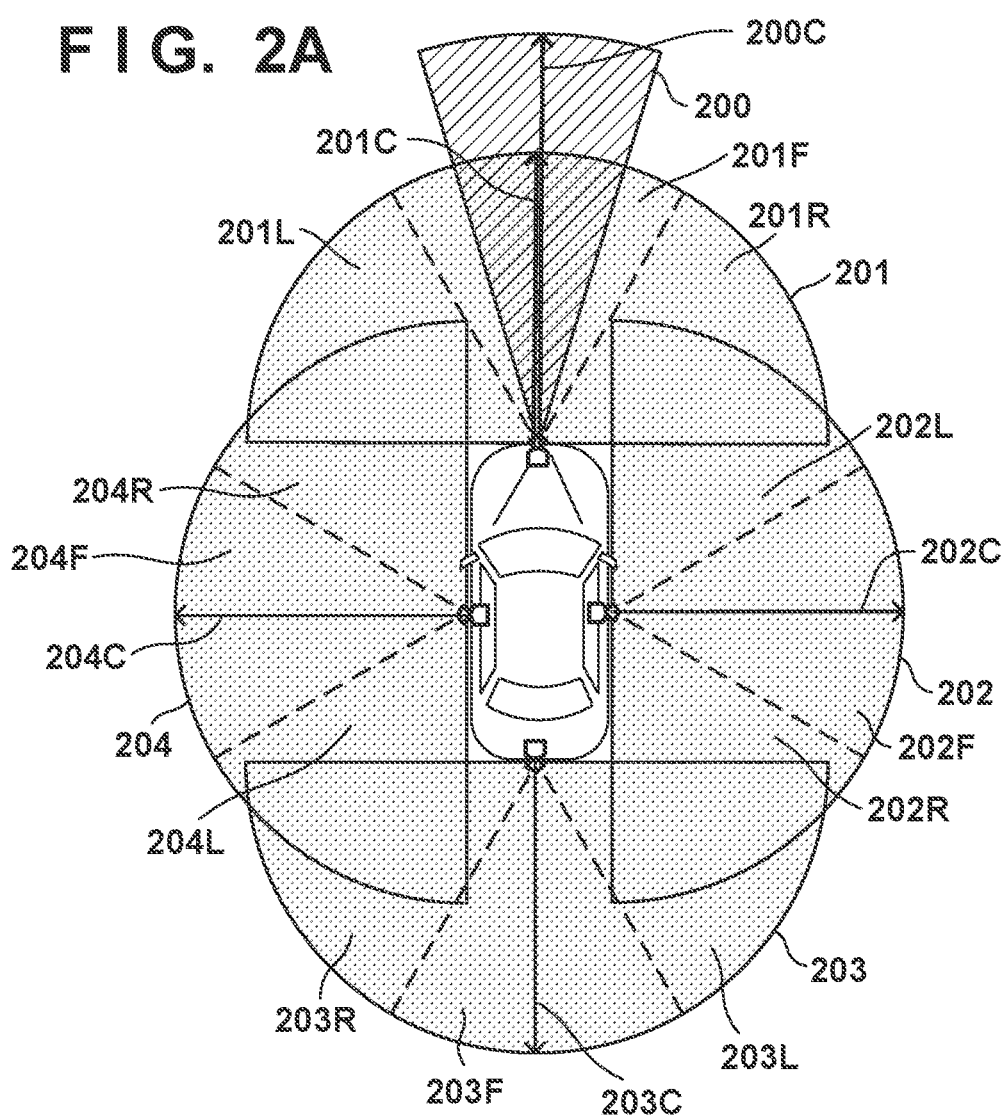
FIGS. 2A to 2C illustrate fields of view of respective cameras on the vehicle.
Figure 2B:
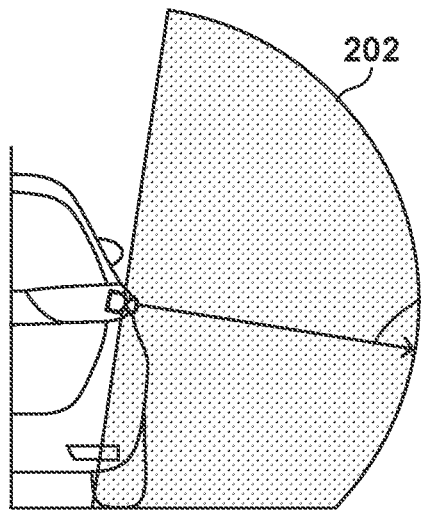
Figure 2C:
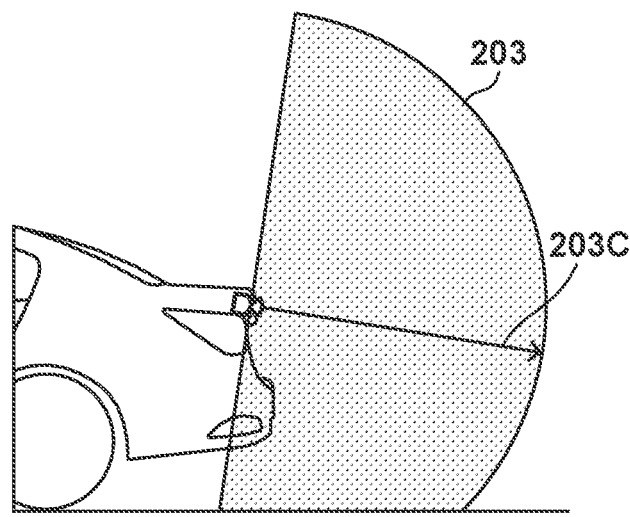

The fields of view of the standard camera 40 and the fisheye cameras 41 to 44 will be described with reference to FIGS. 2A to 2C. FIG. 2A shows the horizontal fields of view of the respective cameras, FIG. 2B shows the vertical field of view of the fisheye camera 42 on the right side of the vehicle 1, and FIG. 2C shows the vertical field of view of the fisheye camera 43 attached at a rear portion of the vehicle 1.

First, fields of view of the vehicle 1 in plan view (i.e., in the horizontal direction of the vehicle 1) will be described with reference to FIG. 2A. The standard camera 40 captures an image of a scene included in a field of view 200. An image-capture center 200C of the standard camera 40 directed immediately in front of the vehicle 1. The horizontal angle of view of the standard camera 40 may be less than 90°, and may be about 45° or about 30°, for example.

The fisheye camera 41 captures an image of a scene included in a field of view 201. An image-capture center 201C of the fisheye camera 41 is directed immediately in front of the vehicle 1. The fisheye camera 42 captures an image of a scene included in a field of view 202. An image-capture center 202C of the fisheye camera 42 is directed immediately to the right of the vehicle 1. The fisheye camera 43 captures an image of a scene included in a field of view 203. An image-capture center 203C of the fisheye camera 43 is directed immediately rearward of the vehicle 1. The fisheye camera 44 captures an image of a scene included in a field of view 204. An image-capture center 204C of the fisheye camera 44 is directed immediately to the left of the vehicle 1. The horizontal angle of view of the fisheye cameras 41 to 44 may be greater than 90°, greater than 150°, or greater than 180°, and may be about 180°, for example. FIG. 2A shows an example in which the horizontal angle of view of the fisheye cameras 41 to 44 is 180°.

The field of view 201 can be divided into a region 201L diagonally forward left of the vehicle 1, a region 201F directly in front of the vehicle 1, and a region 201R diagonally forward right of the vehicle 1. The field of view 202 can be divided into a region 202L diagonally forward right of the vehicle 1, a region 202F directly right of the vehicle 1, and a region 202R diagonally rearward right of the vehicle 1. The field of view 203 can be divided into a region 203L diagonally rearward right of the vehicle 1, a region 203F directly behind the vehicle 1, and a region 203R diagonally rearward left of the vehicle 1. The field of view 204 can be divided into a region 204L diagonally rearward right of the vehicle 1, a region 204F directly left of the vehicle 1, and a region 204R diagonally forward left of the vehicle 1. The field of view 201 may be evenly (i.e., such that the angles of view of the respective regions are equal) divided into the three regions 201L, 201F, and 201R. The other fields of view 202 to 204 may also be evenly divided into three.

Since the standard camera 40 and the fisheye cameras 41 to 44 have the fields of view 200 to 204 as described above, the direct front and the four diagonal directions of the vehicle 1 are included in the fields of view of two separate cameras. Specifically, the direct front of the vehicle 1 is included in both the field of view 200 of the standard camera 40 and the region 201F of the field of view 201 of the fisheye camera 41. A region diagonally forward right of the vehicle 1 is included in both the region 201R of the field of view 201 of the fisheye camera 41 and the region 202L of the field of view 202 of the fisheye camera 42. The same applies to the other three diagonal directions of the vehicle 1.

Next, vertical fields of view of the vehicle 1 will be described with reference to FIGS. 2B and 2C. FIG. 2B illustrates the vertical field of view of the fisheye camera 42, and FIG. 2C illustrates the vertical field of view of the fisheye camera 43. The same may apply to the vertical fields of view of the other fisheye cameras 41 and 44.

The vertical angle of view of the fisheye cameras 41 to 44 may be greater than 90°, greater than 150°, or greater than 180°, and may be about 180°, for example. FIGS. 2B and 2C show an example in which the vertical angle of view of the fisheye cameras 41 to 44 is 180°. The image-capture center 203C of the fisheye camera 43 is directed in a direction parallel to the ground. Alternatively, the image-capture center 203C of the fisheye camera 43 may be directed downward (toward the ground) with respect to the direction parallel to the ground, or may be directed upward (opposite to the ground) with respect to the direction parallel to the ground. In addition, the image-capture centers 201C to 204C of the fisheye cameras 41 to 44 may be directed in different directions in the vertical direction.

(Outline of Distortion Reduction Processing)

Figure 3:
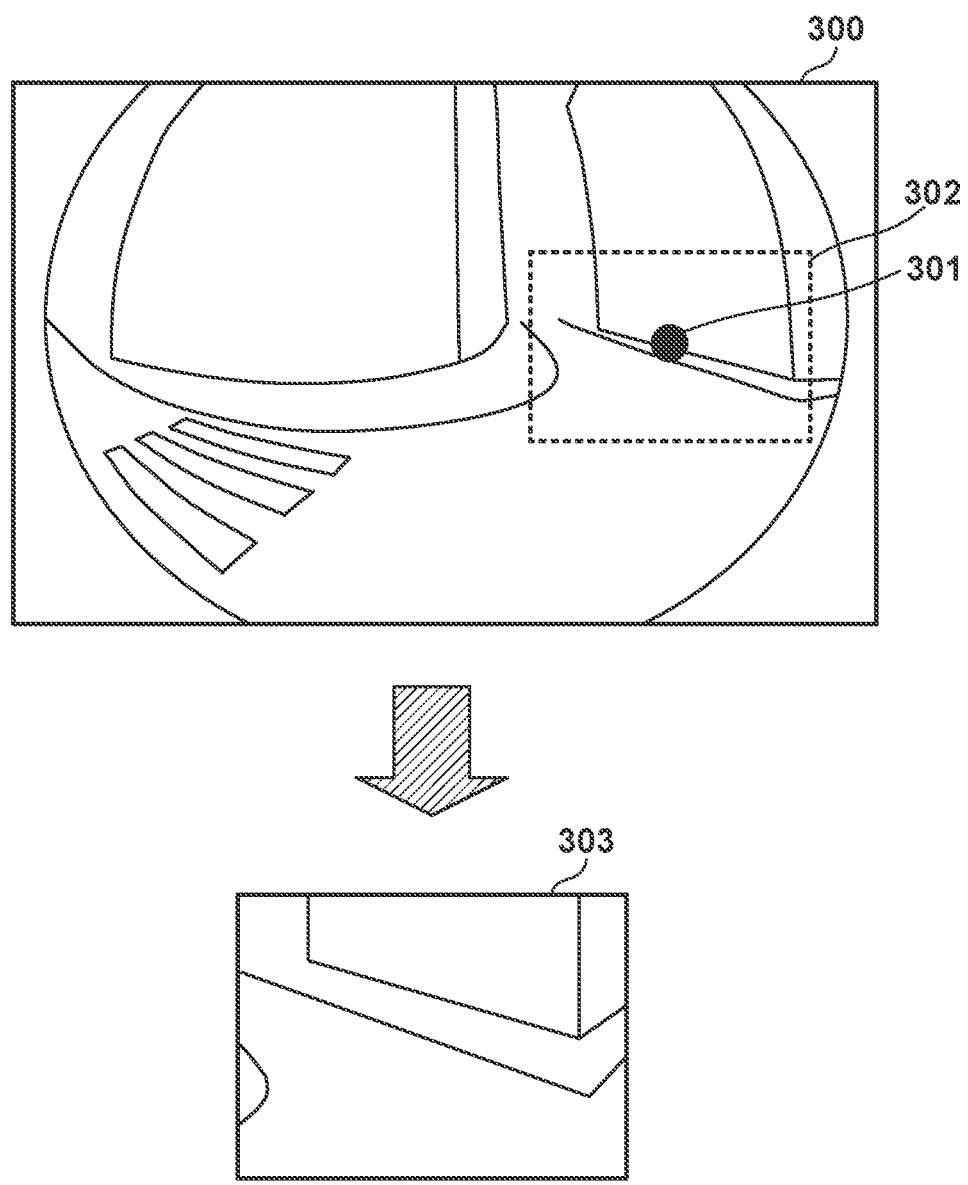
FIG. 3 illustrates an image captured by a fisheye camera and an example of applying distortion reduction processing to the image.

Next, an outline of distortion reduction processing in consideration of a shielding object on images captured by the fisheye cameras 41 to 44 will be described with reference to FIGS. 3 to 8. As shown in FIG. 3, an image 300 is an image of a scene on the right side of the vehicle 1 captured by the fisheye camera 42. As shown, the image 300 has significant distortion, particularly in peripheral portions.

Figure 4A:
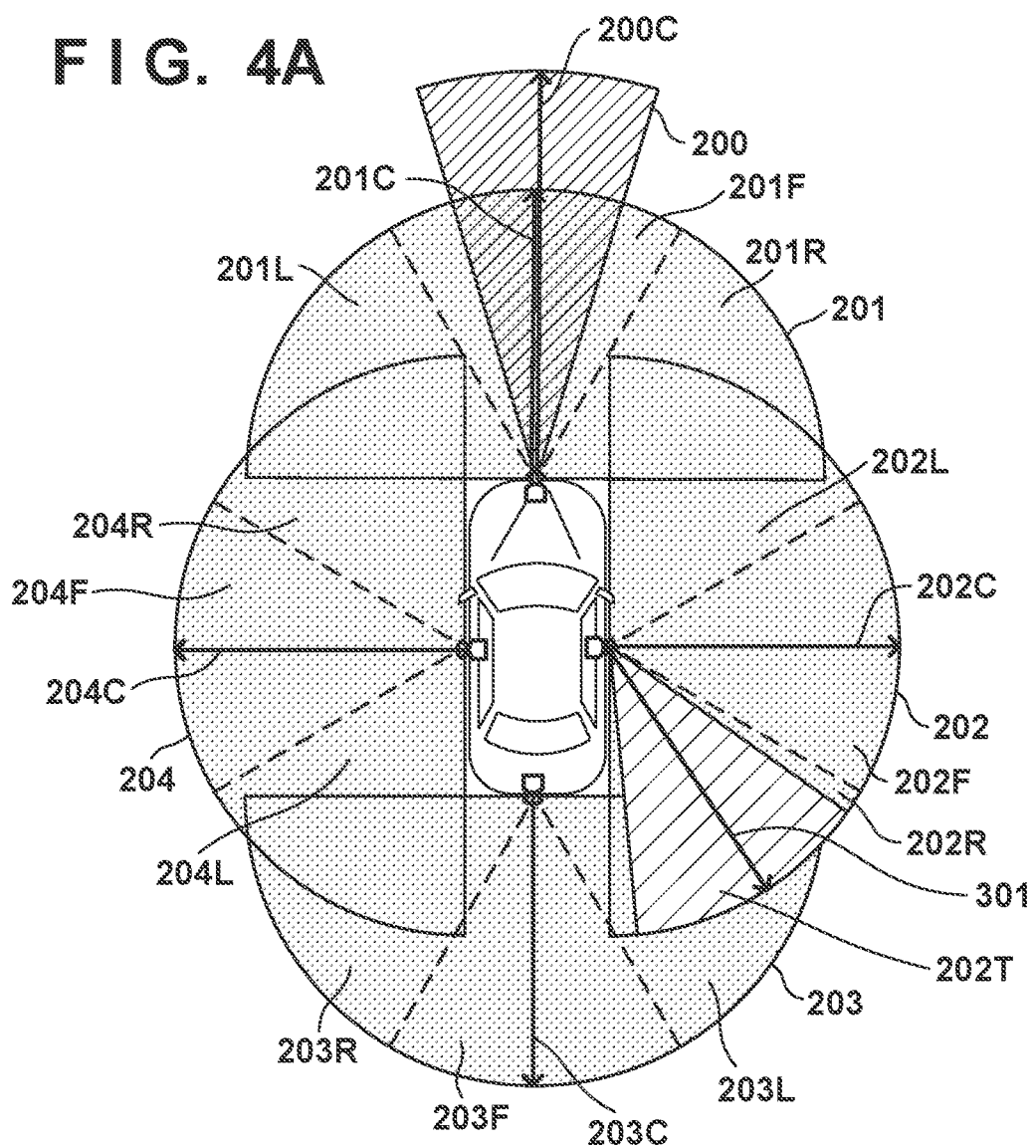
FIGS. 4A and 4B illustrate a region around a transform center.
Figure 4B:
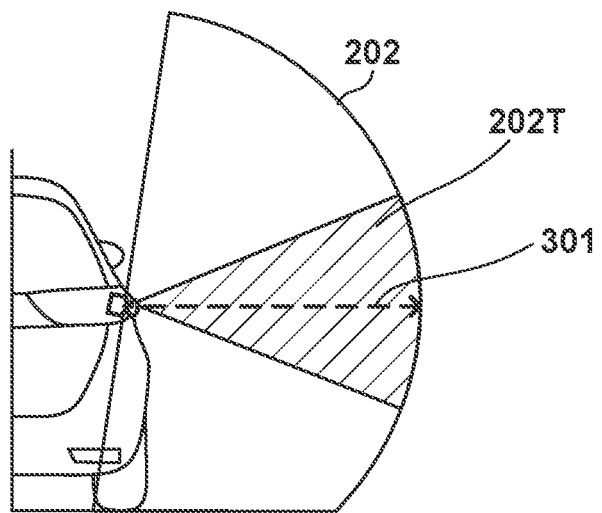

FIG. 4A is a top view of the vehicle 1, and FIG. 4B is a rear view of the vehicle 1. The image 300 is an image of a view on the right side of the vehicle 1 captured by the fisheye camera 43.

The ECU 22 connected to the fisheye camera 43 performs distortion reduction processing on the image 300. Specifically, as shown in FIG. 3, the ECU 22 determines one point in the image 300 as a transform center 301. As shown in FIGS. 4A and 4B, the transform center 301 is located on the right side in the field of view 202 as viewed from the fisheye camera 42 in the horizontal direction, and is directed in a direction parallel to the ground in the vertical direction. Note that, although the example shown in FIGS. 4A and 4B illustrate a case where the present embodiment is applied to 202R as an example, the following embodiment can be applied to any of 202L, 202F, and 202R.

The ECU 22 cuts out, from the image 300, a region 302 centered at the transform center 301. Note that, although the region 302 is shown in the figure as having a rectangle shape for simplicity of description, the shape of the region 302 may not be the shape shown in FIG. 3 as long as the region is configured to correspond to an image 303, which will be described later. As shown in FIG. 4A, this region 302 corresponds to a region 202T in the region 202R located on the right side as viewed from the fisheye camera 42 in the field of view 202. The ECU 22 performs the distortion reduction processing on the region 302 centered at the transform center 301 to generate an image 303 with reduced distortion. The image 303 is an image corresponding to the width of the region 202T in FIG. 4A and the height of the region 202T in FIG. 4B.

As a result of the distortion reduction processing, the distortion is reduced at positions closer to the transform center 301, and the distortion is not reduced or is increased at positions farther from the transform center 301. In a case where the entire image 300 subject to the distortion reduction processing, the distortion increases in a region located farther from the transform center 301. Therefore, even if the external environment of the vehicle 1 is analyzed using a region located far from the transform center 301, accurate analysis cannot be performed. Thus, the ECU 22 sets the transform center 301 in the region to be analyzed, performs distortion reduction processing on a region around the transform center 301, and analyzes the situation of the region to be analyzed using the processed image.

Note that, in a case where it is desired to analyze the situation diagonally forward right of the vehicle 1, the ECU 22 sets the transform center 301 in the region 202L (e.g., at the center of the region 202L) included in the field of view 202 of the fisheye camera 42, performs the distortion reduction processing on a region around the transform center 301, and analyzes the situation diagonally forward right using the processed image. In a case where it is desired to analyze the situation directly to the right of the vehicle 1, the ECU 22 sets the transform center 301 in the region 202F (e.g., at the center of the region 202F) included in the field of view 202 of the fisheye camera 42, performs the distortion reduction processing on a region around the transform center 301, and analyzes the situation directly to the right using the processed image. In a case where it is desired to analyze the situation diagonally rearward right of the vehicle 1, the ECU 22 sets the transform center 301 in the region 202R (e.g., at the center of the region 202R) included in the field of view 202 of the fisheye camera 42, performs the distortion reduction processing on a region around the transform center 301, and analyzes the situation diagonally rearward right using the processed image.

As described above, in the case of analyzing the situation on the right side of the vehicle for example, the ECU 22 acquires an image from the fisheye camera 42, then sets the transform center 301 in a direction as required for analyzing the situation, and performs the distortion reduction processing on a region around the transform center 301.

Figure 7:
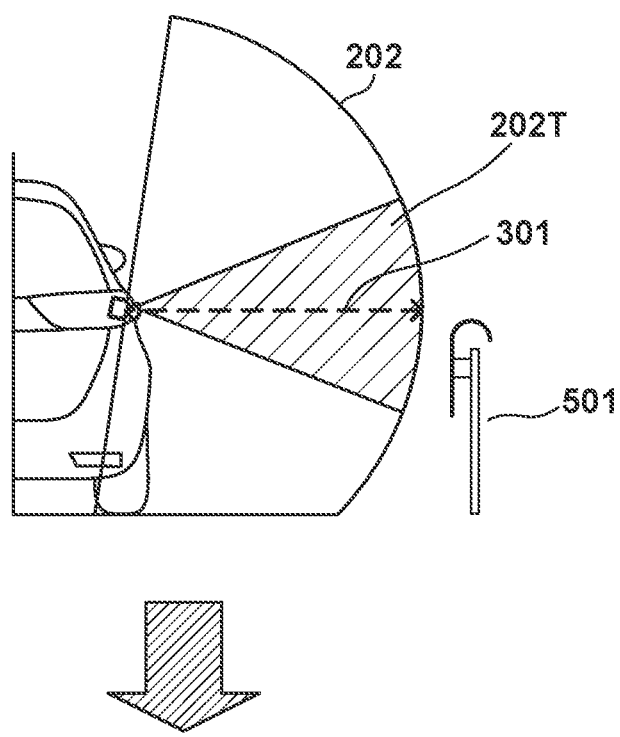
FIG. 7 illustrates another example of changing the region around the transform center in a case where a shielding object exists.
Figure 7:
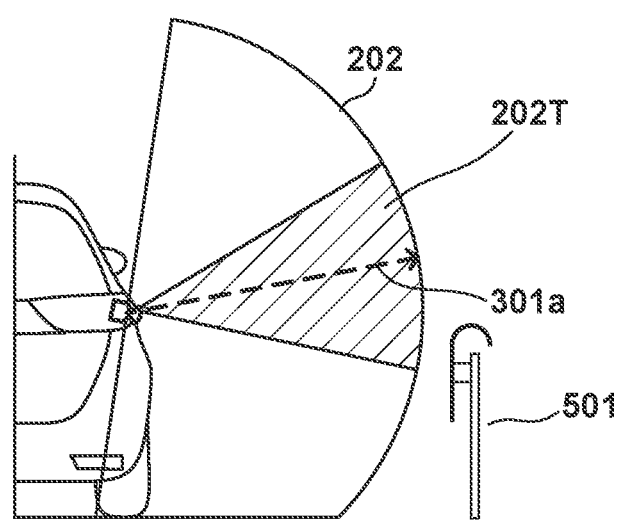

Meanwhile, in the case of acquiring an image captured by the fisheye camera 42, a shielding object 501 such as a guardrail may exist in a region around the transform center 301 set, which decreases a region other than the shielding object (e.g., see the upper part of FIG. 7). In a case where the shielding object occupies a certain area in the region 302 around the transform center 301, it is impossible to perform sufficient analysis for the region other than the shielding object, or unnecessary processing is involved for analysis for the region of the shielding object. The shielding object 501 exists, for example, between the roadway and the sidewalk, and obstructs image recognition for a target object or a traffic participant that may exist on the sidewalk side. The shielding object includes not only a guardrail but also grass, a tree, and the like with a height of 700 mm or more. The shielding object includes a shielding object extending in the traveling direction of the vehicle (e.g., the horizontal direction).

In a case where a shielding object extending in the horizontal direction is included in the region 302 (e.g., such a shielding object is recognized from the image 300 as described later), the ECU 22 can change the region around the transform center 301 such that the region other than the shielding object increases.

Figure 5A:
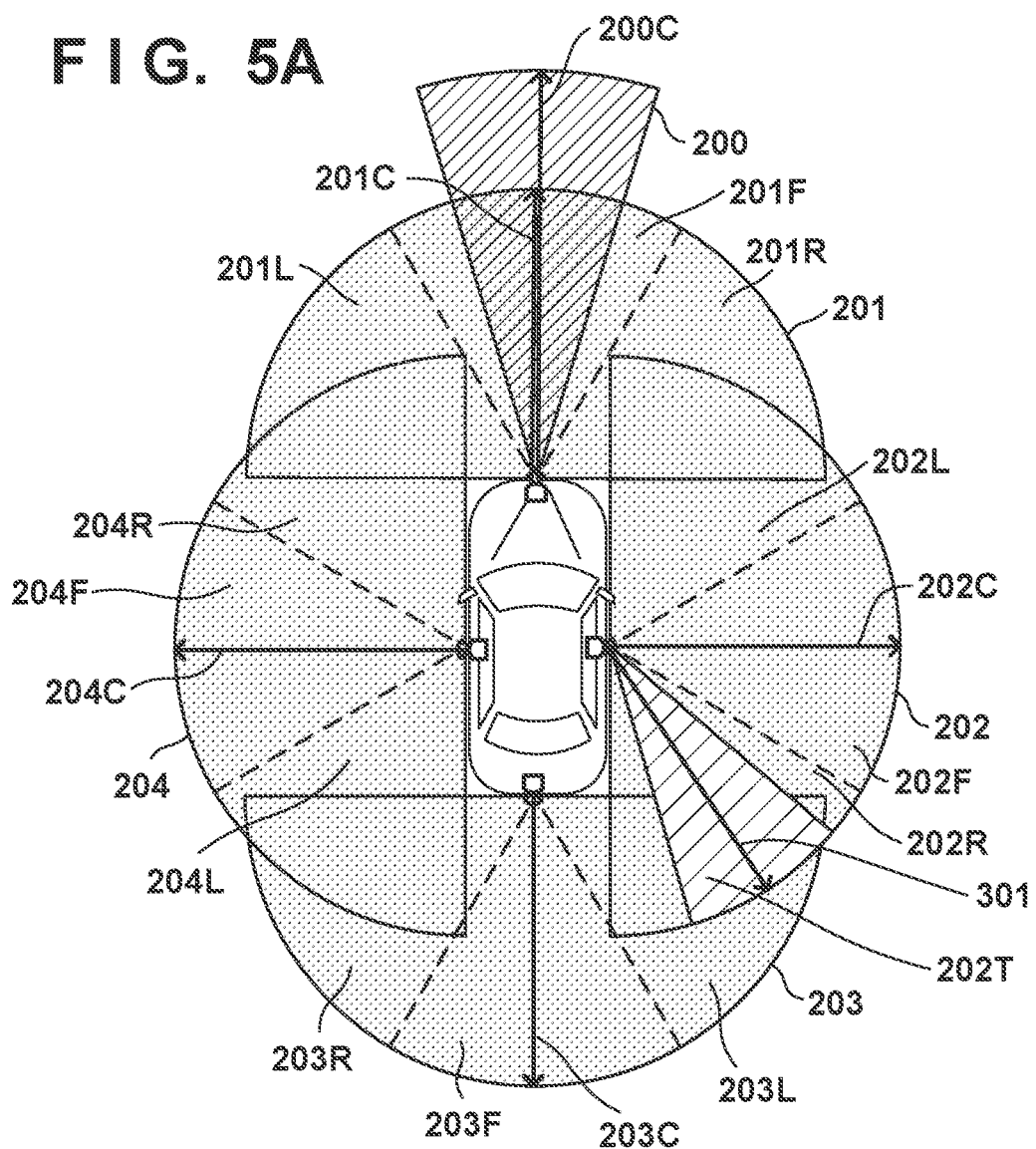
FIGS. 5A and 5B illustrate an example of changing the region around the transform center in a case where a shielding object exists.
Figure 5B:
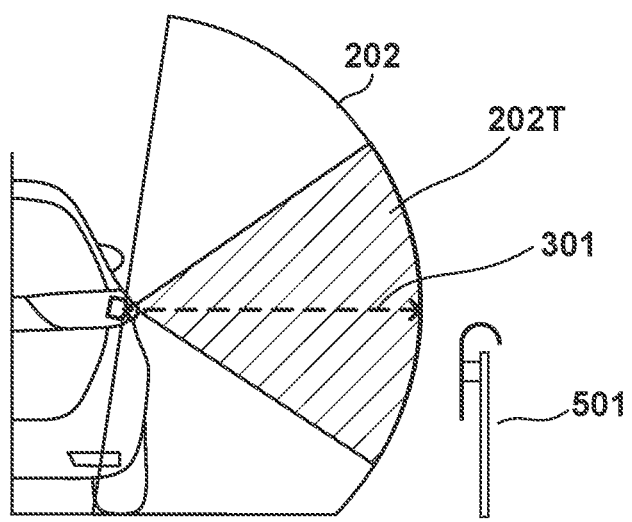

For example, in a case where a shielding object extending in the horizontal direction is included in the region 302, the ECU 22 can increase the region other than the shielding object included in the region around the transform center 301 by changing the region around the transform center 301 as shown in FIGS. 5A and 5B. For example, the ECU 22 changes the region around the transform center 301 such that the image 303 has a rectangle shape elongated in the vertical direction. The region 202T around the transform center 301 in a horizontal plane in a top view of the vehicle 1 is narrowed as shown in FIG. 5A, and the region 202T around the transform center 301 in a vertical plane in a rear view of the vehicle 1 is widened as shown in FIG. 5B.

Figure 6:
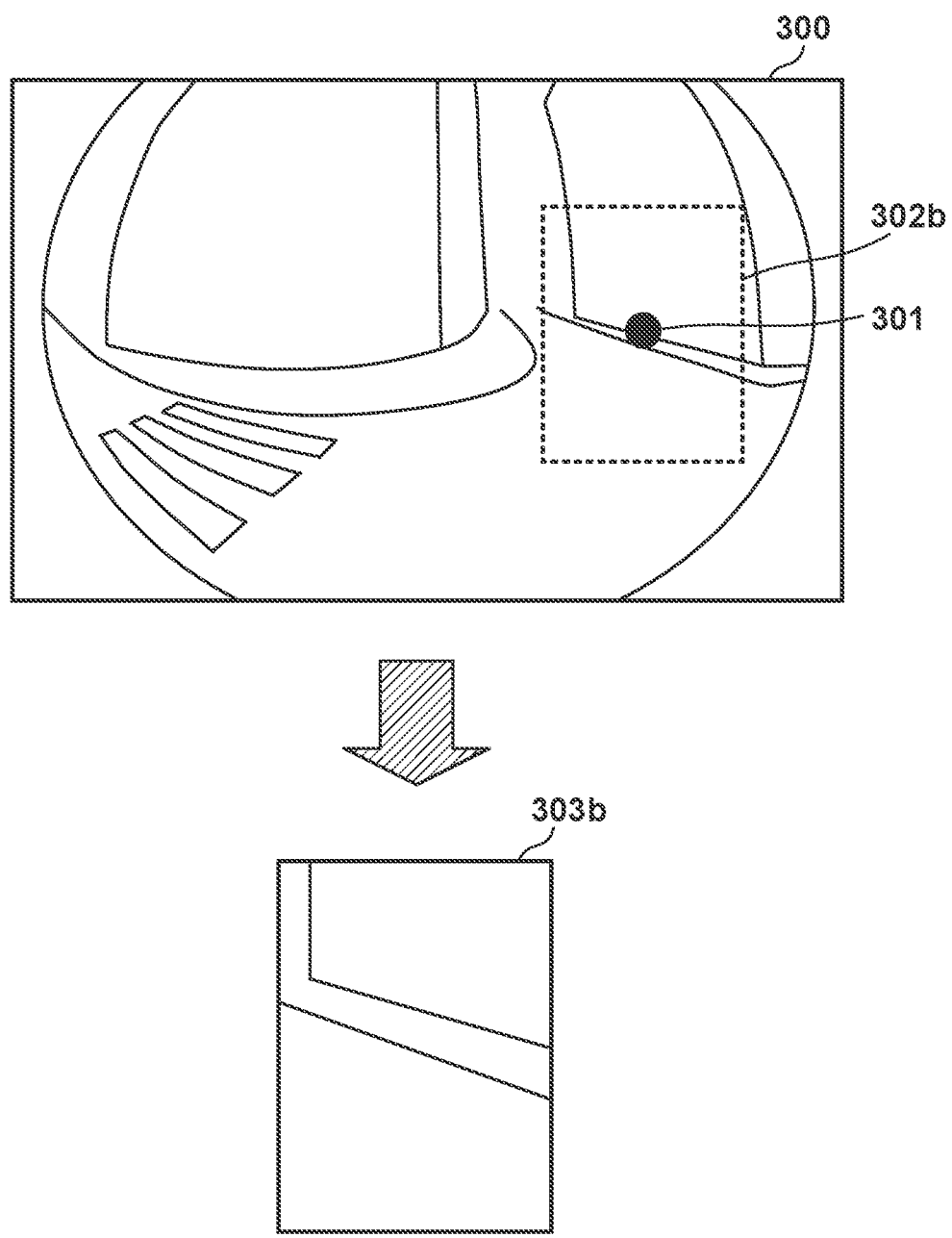
FIG. 6 illustrates an example of changing the region around the transform center and an example of an image generated by the distortion reduction processing.

FIG. 6 schematically shows an example in which the region around the transform center 301 is changed from the region 302 to a region 302b in accordance with the example of the image 300 shown in FIG. 3. The region 302 corresponds to the image 303 with a rectangular shape elongated in the horizontal direction, whereas the region 302b corresponds to an image 303b with a rectangular shape elongated in the vertical direction. In a case where the shielding object 501 extending in the horizontal direction is included on the lower side in the region 302, the ECU 22 changes the region 302 to the region 302b, so that the region other than the shielding object included in the region 302b increases. In this manner, in a case where the ECU 22 performs distortion reduction processing on the region 302b around the transform center 301, the region other than the shielding object also increases in the processed image 303b. As described above, the ECU 22 changes the region 302 around the transform center so as to increase the region other than the shielding object, whereby the influence of the shielding object can be reduced in target object recognition using the image captured by the fisheye camera.

Such processing of changing the region around the transform center 301 such that the image 303 has a rectangular shape elongated in the vertical direction is also useful in analyzing the presence of a traffic participant or the like in a region where the shielding object extending in the horizontal direction disappears.

Furthermore, other methods may be used to change the region 302 around the transform center so as to increase the region other than the shielding object.

For example, in a case where a shielding object extending in the horizontal direction is included in the region 302 (e.g., such a shielding object is recognized from the image 300 as described later) as shown in FIG. 7, the ECU 22 can change the position of the transform center 301 such that the region other than the shielding object increases. Specifically, the ECU 22 sets a transform center 301a such that its position in the image 300 is higher than the position of the transform center 301, and performs distortion reduction processing on a region around the transform center 301a.

Figure 8:
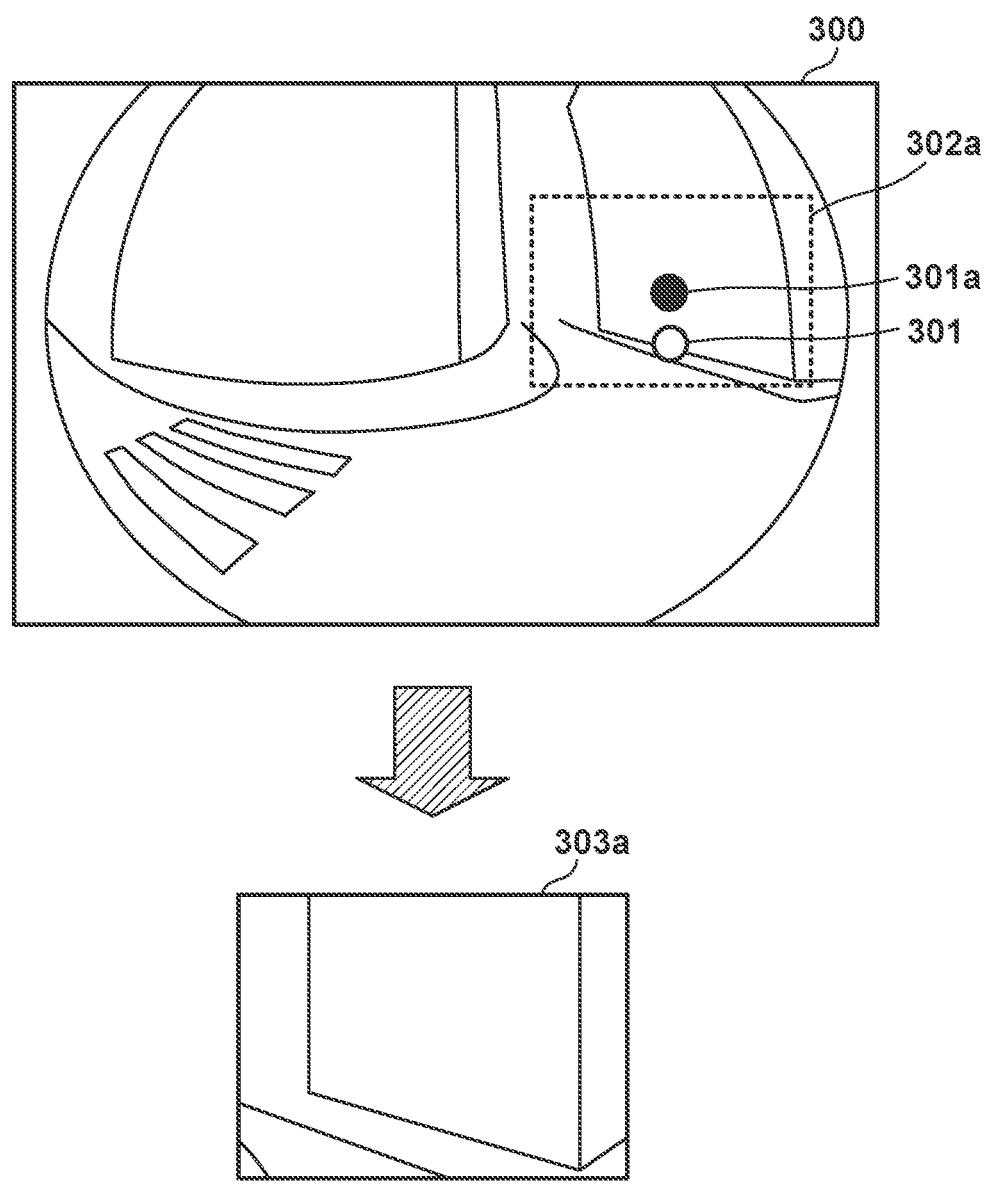
FIG. 8 illustrates an example of changing the region around the transform center and an example of an image generated by the distortion reduction processing.
Figure 9:
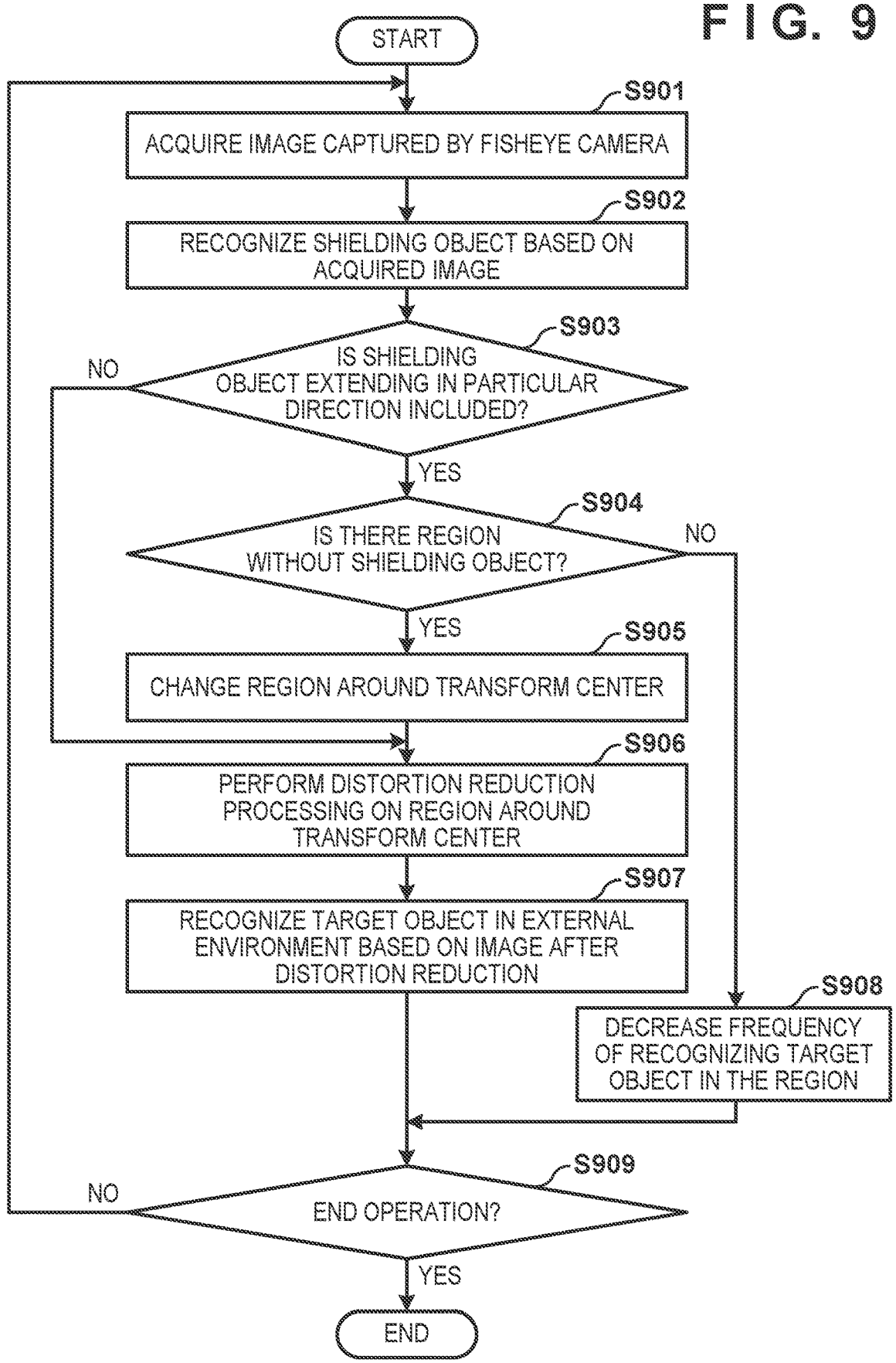
FIG. 9 is a flowchart illustrating a series of operations of a process of recognizing the external environment of the vehicle according to the present embodiment.

FIG. 8 schematically shows a case where the position of the transform center 301 is changed to the position of the transform center 301a (and the surrounding region is also changed) in accordance with the example of the image 300 shown in FIG. 3. As the ECU 22 changes the region 302 to the region 302a, the region other than the shielding object 501 included in the region 302a increases. In this manner, in a case where the ECU 22 performs distortion reduction processing on the region 302a around the transform center 301a, the region other than the shielding object also increases in the processed image 303a. As described above, the ECU 22 changes the position of the transform center 301 and changes the region 302 around the transform center so as to increase the region other than the shielding object, whereby the influence of the shielding object can be reduced in target object recognition using the image captured by the fisheye camera.

(Series of Operations of Process of Recognizing External Environment of Vehicle)

Next, a series of operations of a process of recognizing the external environment of the vehicle will be described. A series of operations of the distortion reduction processing will be described. This processing is implemented by the processor 20a of each of ECUs 20 to 29 of the control apparatus 2 executing a program in the memory 20b.

Note that the processing of recognizing the external environment of the vehicle can be performed while determining one or more regions to be subjected to the distortion reduction processing in images acquired from the respective cameras in accordance with traveling scenes of the vehicle 1 (such as a scene of entering a T-junction intersection, a scene of traveling on a narrow road, and a scene of turning right or left at an intersection). However, in the following description, a case of performing distortion reduction processing on the region of 204F beside the vehicle 1 (on the left side of the vehicle) will be described as an example. Note that, in this process, the direction of the transform center as viewed from behind the vehicle 1 is set in the horizontal direction, and the region around the transform center is set such that the image corresponding to the region has a rectangular shape extending in the horizontal direction after the distortion reduction processing.

In S901, the control apparatus 2 acquires an image captured by the fisheye camera 44 of the fisheye cameras 41 to 44. The image captured by the fisheye camera 44 is an image with as significant distortion as the image 300 described above.

In S902, the control apparatus 2 instructs the ECU 22 to execute processing of recognizing a target object (shielding object) in the external environment of the vehicle 1 based on the image captured by the fisheye camera 44. The target object in the external environment of the vehicle to be recognized is a shielding object such as a guardrail or grass as described above. Since the shielding object assumed in the present embodiment is relatively close to the vehicle 1 (e.g., between the roadway and the sidewalk), the presence of the shielding object can be recognized even in the case of using an image captured by the fisheye camera 44. The recognition of the shielding object can be realized by using a model trained with fisheye camera images including shielding objects as training data by using, for example, known deep learning techniques. When an unknown fisheye camera image is input, the trained model outputs the presence or absence of a shielding object in the image and a region of the shielding object. The model may output one or more regions in which the shielding object exists.

In S903, the control apparatus 2 determines whether a shielding object extending in a particular direction (e.g., the horizontal direction) is included in a region around the transform center. In the case of determining that the shielding object is included in the region around the transform center, the control apparatus 2 advances the process to S904. Otherwise, the control apparatus 2 advances the process to S906. The control apparatus 2 determines whether the shape of the shielding object recognized by the trained model is a shielding object extending in a particular direction (e.g., the horizontal direction). Whether it is a shielding object extending in a particular direction may be determined, for example, according to whether the horizontal length of the region of the shielding object in the image is greater than or equal to a predetermined length.

In S904, the control apparatus 2 determines whether there is a region without the shielding object in the region around the transform center based on the region of the shielding object determined in S902. For example, in a case where the region other than the shielding object is larger than a predetermined proportion (e.g., 15%) in the region around the transform center, the control apparatus 2 determines that there is a region without the shielding object. In the case of determining that there is a region without the shielding object, the control apparatus 2 advances the process to S905. Otherwise, the control apparatus 2 advances the process to S908.

In S905, the control apparatus 2 changes the region around the transform center. For example, the control apparatus 2 changes the region around the transform center by using the method described with reference to FIGS. 5A, 5B, and 6. That is, in a case where the shielding object is included in the region around the transform center, the region around the transform center is changed such that the region other than the shielding object increases. By using the method described with reference to FIGS. 5A, 5B, and 6, it is possible to easily obtain a region other than the shielding object in a region extending in the vertical direction with respect to the shielding object extending in the horizontal direction (in particular, above the shielding object).

At this time, the control apparatus 2 changes the region around the transform center such that the size of the image corresponding to the region around the transform center before the change is the same as the size of the image corresponding to the region around the transform center after the change. Since this allows the image after subsequent distortion reduction processing to have the same size before and after the change, the load in the image recognition processing using the image becomes constant. That is, it is possible to keep the processing time for each image within a required time and to keep the power consumption within a predetermined level.

In S906, the control apparatus 2 performs distortion reduction processing on the region around the transform center. As a result of the processing of S905, for example, the image corresponding to the region around the transform center changes from a rectangular shape elongated in the horizontal direction (the image 303) to a rectangular shape elongated in the vertical direction (the image 303*b*).

In S907, the control apparatus 2 recognizes the target object in the external environment based on the image subjected to the distortion reduction processing. In particular, the recognition of the target object in the external environment is performed to recognize the situation of the region other than the shielding object (to recognize the presence of a traffic participant or the like). The recognition of the traffic participant and the target object can be realized by using, for example, a model trained with images (corresponding to images after distortion correction) including persons and target objects to be recognized as training data by using, for example, known deep learning techniques. When an unknown image (image after distortion reduction processing) is input, the trained model outputs the presence or absence of a recognition target in the image and a region of the target. The model may output one or more regions in which the recognition target exists.

In S908, the control apparatus 2 decreases the frequency of recognizing the target object in the external environment in the region around the transform center considered (because the image is occupied by the shielding object). For example, the control apparatus 2 decreases the frequency of recognizing the target object in the region of 204F beside the vehicle 1 (on the left side of the vehicle) and increases the frequency for the region of 204L, or decreases the frequency of using an image beside the vehicle 1 (on the left side of the vehicle) for target object recognition.

In S909, the control apparatus 2 determines whether to end the operation, and returns the process to S901 in the case of continuing the operation, and ends the process otherwise.

Note that the above description has been made by using an example in which the method shown in FIGS. 5A, 5B, and 6 is used to change the region around the transform center in S905. However, the region around the transform center may be changed by using the method shown in FIGS. 7 and 8. That is, the region around the transform center is changed by moving the position of the transform center in a direction vertical to the extending direction of the shielding object.

In addition, the region around the transform center may be changed by using another method instead of the above-described method. For example, the control apparatus 2 may increase the region other than the shielding object included in the region around the transform center by setting the position of the transform center in a region in which the shielding object does not exist. Alternatively, the control apparatus 2 may set the region around the transform center in a region in which the shielding object is not recognized in the image captured by the fisheye camera. In this case as well, more accurate image analysis can be performed (because the region of the shielding object is reduced or eliminated) for the image to which the distortion reduction processing is applied.

Furthermore, in the above-described embodiment, processing on an image captured by a camera (the fisheye camera 42, 44) that captures a side portion of the vehicle 1 has been described as an example. However, the above-described processing can also be applied to a captured image of a front or rear portion of the vehicle 1. That is, in a case where a shielding object extending in the horizontal direction is included in a captured image of a front or rear portion of the vehicle 1, it is possible to control the region to which the distortion reduction processing is applied such that the region other than the shielding object increases.

In addition, not the entire processing of recognizing the external environment of the vehicle described above may be performed in the vehicle 1. For example, when an image captured by a fisheye camera is acquired on the vehicle 1 side, the acquired image may be transmitted to an external server (not shown), all or part of the processing of S902 to S907 may be performed in the external server, and the vehicle 1 may receive the processing result.

As described above, in the present embodiment, an image of the external environment of the vehicle is periodically acquired from a wide-angle camera (fisheye camera), and a target object (shielding object) in the external environment of the vehicle is recognized based on the image acquired from the wide-angle camera. In addition, in the present embodiment, the setting of a predetermined region (region around the transform center) is controlled for the image from the wide-angle camera, and distortion reduction processing for reducing the distortion of the image is performed for the set predetermined region. At this time, in the present embodiment, in a case where the shielding object is included in the predetermined region (region around the transform center), the predetermined region (region around the transform center) is changed such that the region other than the shielding object increases. In this manner, more accurate image analysis can be performed (because the region of the shielding object is reduced) for the image to which the distortion reduction processing is applied. In other words, it is possible to reduce the influence of the shielding object in target object recognition using the image captured by the camera provided with the wide-angle lens.

Summary of Embodiment

1. A control apparatus (for example, 2) according to the above embodiment is a control apparatus for a vehicle (for example, 1) including an image capturing device (for example, 41-44), the control apparatus comprising:

an image acquisition unit (for example, 22, 23, S901) configured to periodically acquire an image of an external environment of the vehicle from the image capturing device;

a first recognition unit (for example, 2, 22, 23, S902) configured to recognize a target object in the external environment of the vehicle based on the image acquired from the image capturing device;

a region control unit (for example, 2, 22, 23, S905) configured to control setting of a predetermined region for the image acquired from the image capturing device; and a processing unit (for example, 2, 22, 23, S906) configured to perform distortion reduction processing for reducing distortion of the image for the set predetermined region, wherein in a case where a particular target object recognized by the first recognition unit is included in the predetermined region, the region control unit changes the predetermined region such that a region other than the particular target object included in the predetermined region increases (for example, S905).

According to this embodiment, it is possible to reduce the influence of a shielding object in target object recognition using an image captured by a camera provided with a wide-angle lens.

2. In the above embodiment, in a case where the particular target object is not included in a first region of the image acquired from the image capturing device, the region control unit sets the first region as the predetermined region, and in a case where the particular target object is included in the first region, the region control unit changes the predetermined region from the first region to a second region such that a region other than the particular target object included in the predetermined region increases.

According to this embodiment, the distortion reduction processing can be performed directly in a case where the shielding object does not exist, whereas the influence of the shielding object can be reduced when the shielding object exists.

3. In the above embodiment, in a case where the particular target object is a shielding object extending in a first direction, the region control unit changes the predetermined region from the first region to the second region such that an image corresponding to the predetermined region becomes an image elongated in a second direction perpendicular to the first direction.

According to this embodiment, it is possible to easily obtain a region other than the shielding object in a region extending in a direction perpendicular to the shielding object extending in a particular direction.

4. In the above embodiment, in a case where the particular target object is a shielding object extending in a horizontal direction, the region control unit changes the predetermined region from the first region to the second region such that an image elongated in the horizontal direction becomes an image elongated in a vertical direction.

According to this embodiment, it is possible to easily obtain a region other than the shielding object in a region extending in a direction vertical to the shielding object extending in the horizontal direction (in particular, above the shielding object).

5. In the above embodiment, the region control unit changes the predetermined region from the first region to the second region such that a size of an image corresponding to the first region and a size of an image corresponding to the second region become the same.

According to this embodiment, since the image after subsequent distortion reduction processing has the same size before and after the change, the load in the image recognition processing using the image becomes constant. That is, it is possible to keep the processing time for each image within a required time and to keep the power consumption within a predetermined level.

6. In the above embodiment, the predetermined region is a region defined by a transform center provided in the image acquired from the image capturing device, and the region control unit changes the predetermined region by controlling a position of the transform center.

According to this embodiment, by using a region close to the transform center as the transform target, it is possible to change the region to be subjected to the distortion reduction processing while suppressing the distortion of the image to be subjected to the distortion reduction processing.

7. In the above embodiment, the region control unit changes the predetermined region such that the transform center is set in a region in which the particular target object does not exist.

According to this embodiment, more accurate image analysis can be performed (because the region of the shielding object is reduced or eliminated) for the region to which the distortion reduction processing is applied.

8. In the above embodiment, the image capturing device includes a fisheye lens.

According to this embodiment, it is possible to analyze the situation of a wide area of the external environment of the vehicle with one camera.

9. In the above embodiment, the image capturing device is arranged to capture an image of an external environment in at least one of a front direction, a side direction, and a rear direction of the vehicle.

According to this embodiment, it is possible to analyze the situation of the external environment of the vehicle in various directions.

10. In the above embodiment, the control apparatus further comprises a second recognition unit configured to recognize the external environment of the vehicle based on an image with reduced distortion.

According to this embodiment, it is possible to perform more accurate image analysis such as checking the presence of a farther traffic participant or target object.

11. A control apparatus (for example, 2) according to the above embodiment is a control apparatus for a vehicle (for example, 1) including an image capturing device (for example, 41-44), the control apparatus comprising:

an image acquisition unit (for example, 22, 23, S901) configured to periodically acquire an image of an external environment of the vehicle from the image capturing device;

a recognition unit (for example, 2, 22, 23, S902) configured to recognize a target object in the external environment of the vehicle based on the image acquired from the image capturing device;

a region control unit (for example, 2, 22, 23, S905) configured to control setting of a predetermined region for the image acquired from the image capturing device; and a processing unit (for example, 2, 22, 23, S906) configured to perform distortion reduction processing for reducing distortion of the image for the set predetermined region, wherein the region control unit sets the predetermined region in a region in which a particular target object is not recognized by the recognition unit (for example, S905).

According to this embodiment, it is possible to reduce the influence of a shielding object in target object recognition using an image captured by a camera provided with a wide-angle lens.

12. The vehicle according to the above embodiment is a vehicle (for example, 1) including the control apparatus according to any one of 1 to 11 above.

According to this embodiment, it is possible to reduce the influence of a shielding object in target object recognition using an image captured by a camera provided with a wide-angle lens in a vehicle.

The invention is not limited to the foregoing embodiments, and various variations/changes are possible within the spirit of the invention.

What is claimed is:

1. A control apparatus for a vehicle including an image capturing device, the control apparatus comprising:
   one or more processors; and
   a memory storing instructions which, when the instructions are executed by the one or more processors, cause the control apparatus to function as:
   an image acquisition unit configured to periodically acquire an image of an external environment of the vehicle from the image capturing device;
   a first recognition unit configured to recognize a target object in the external environment of the vehicle based on the image acquired from the image capturing device;
   a region control unit configured to control setting of a predetermined region for the image acquired from the image capturing device; and
   a processing unit configured to perform distortion reduction processing for reducing distortion of the image for the set predetermined region,
   wherein in a case where a particular target object recognized by the first recognition unit is included in the predetermined region, the region control unit changes the predetermined region such that a region other than the particular target object included in the predetermined region increases,
   wherein in a case where the particular target object is not included in a first region of the image acquired from the image capturing device, the region control unit sets the first region as the predetermined region, and in a case where the particular target object is included in the first region, the region control unit changes the predetermined region from the first region to a second region such that the region other than the particular target object included in the predetermined region increases, and
   wherein in a case where the particular target object is a shielding object extending in a first direction, the region control unit changes the predetermined region from the first region to the second region such that an image corresponding to the predetermined region becomes an image elongated in a second direction perpendicular to the first direction.

2. The control apparatus according to claim 1, wherein in a case where the particular target object is a shielding object extending in a horizontal direction, the region control unit changes the predetermined region from the first region to the second region such that an image elongated in the horizontal direction becomes an image elongated in a vertical direction.

3. The control apparatus according to claim 1, wherein the region control unit changes the predetermined region from the first region to the second region such that a size of an image corresponding to the first region and a size of an image corresponding to the second region become the same.

4. The control apparatus according to claim 1, wherein
   the predetermined region is a region defined by a transform center provided in the image acquired from the image capturing device, and
   the region control unit changes the predetermined region by controlling a position of the transform center.

5. The control apparatus according to claim 4, wherein the region control unit changes the predetermined region such that the transform center is set in a region in which the particular target object does not exist.

6. The control apparatus according to claim 1, wherein the image capturing device includes a fisheye lens.

7. The control apparatus according to claim 1, wherein the image capturing device is arranged to capture the image of the external environment in at least one of a front direction, a side direction, and a rear direction of the vehicle.

8. The control apparatus according to claim 1, further comprising a second recognition unit configured to recognize the external environment of the vehicle based on an image with reduced distortion.

9. A control method for a vehicle including an image capturing device, the control method comprising:
   periodically acquiring an image of an external environment of the vehicle from the image capturing device;
   recognizing a target object in the external environment of the vehicle based on the image acquired from the image capturing device;
   controlling setting of a predetermined region for the image acquired from the image capturing device; and
   performing distortion reduction processing for reducing distortion of the image for the set predetermined region, wherein
   the controlling setting of a predetermined region includes, in a case where a particular target object recognized in the recognizing is included in the predetermined region, changing the predetermined region such that a region other than the particular target object included in the predetermined region increases,
   wherein in a case where the particular target object is not included in a first region of the image acquired from the image capturing device, the controlling includes setting the first region as the predetermined region, and in a case where the particular target object is included in the first region, the controlling includes changing the predetermined region from the first region to a second region such that the region other than the particular target object included in the predetermined region increases,
   wherein in a case where the particular target object is a shielding object extending in a first direction, the controlling includes changing the predetermined region from the first region to the second region such that an image corresponding to the predetermined region becomes an image elongated in a second direction perpendicular to the first direction.

\* \* \* \* \*